US012784412B2

(12) United States Patent
Jha et al.

(10) Patent No.: US 12,784,412 B2
(45) Date of Patent: Nov. 3, 2026

(54) MODEL DESIGN AND EXECUTION FOR EMPTY SHELF DETECTION

(71) Applicant: Target Brands, Inc., Minneapolis, MN (US)

(72) Inventors: Dipendra Jha, Sunnyvale, CA (US); Ata Mahjoubfar, Sunnyvale, CA (US); Anupama Joshi, Sunnyvale, CA (US)

(73) Assignee: Target Brands, Inc., Minneapolis, MN (US)

( * ) Notice: Subject to any disclaimer, the term of this patent is extended or adjusted under 35 U.S.C. 154(b) by 480 days.

(21) Appl. No.: 18/166,918

(22) Filed: Feb. 9, 2023

(65) Prior Publication Data

US 2023/0252766 A1 Aug. 10, 2023

Related U.S. Application Data

(60) Provisional application No. 63/308,387, filed on Feb. 9, 2022.

(51) Int. Cl.

| | |
|---|---|
| ***G06V 10/774*** | (2022.01) |
| ***G06Q 10/087*** | (2023.01) |
| ***G06T 7/62*** | (2017.01) |
| ***G06V 10/764*** | (2022.01) |
| ***G06V 10/776*** | (2022.01) |
| ***G06V 10/94*** | (2022.01) |
| ***G06V 20/52*** | (2022.01) |

(52) U.S. Cl.
CPC ......... *G06V 10/774* (2022.01); *G06Q 10/087* (2013.01); *G06T 7/62* (2017.01); *G06V 10/776* (2022.01); *G06V 10/95* (2022.01); *G06V 20/52* (2022.01)

(58) Field of Classification Search
CPC .... G06V 10/774; G06V 10/776; G06V 10/95; G06V 20/52; G06V 10/764; G06V 10/82; G06Q 10/087; G06T 7/62
See application file for complete search history.

(56) References Cited

U.S. PATENT DOCUMENTS

| | | | | |
|---|---|---|---|---|
| 10,943,096 | B2 * | 3/2021 | Yi | G06V 40/168 |
| 11,468,400 | B1 * | 10/2022 | Kumar | G01G 19/387 |
| 11,842,321 | B1 * | 12/2023 | Zou | G06V 20/52 |
| 2014/0299663 | A1 * | 10/2014 | Shah | G06K 7/08 235/385 |
| 2015/0379426 | A1 * | 12/2015 | Steele | G06N 5/025 706/12 |
| 2018/0165728 | A1 | 6/2018 | McDonald et al. | |

(Continued)

OTHER PUBLICATIONS

Priyanwada et al., "Vision Based Intelligent Shelf-Management System," 6th International Conference on Information Technology Research. Dec. 1, 2021, 3 pages.

(Continued)

*Primary Examiner* — Amandeep Saini
*Assistant Examiner* — Emma Rose Goebel
(74) *Attorney, Agent, or Firm* — Merchant & Gould P.C.

(57) ABSTRACT

An in-store system for empty shelf detection substantially reduces computational resources required to determine where out-of-stock conditions are present. Such systems can prioritize analysis of product displays having different levels of turnover or importance, and can use on-site resources to make quick and accurate determinations of out-of-stock conditions that impact customer satisfaction.

20 Claims, 8 Drawing Sheets

(56) References Cited

U.S. PATENT DOCUMENTS

| | | | | |
|---|---|---|---|---|
| 2018/0322448 | A1 | 11/2018 | Nemati et al. | |
| 2019/0034875 | A1* | 1/2019 | Bryan | B65G 1/1378 |
| 2019/0213546 | A1* | 7/2019 | Adato | G08B 21/182 |
| 2022/0327314 | A1* | 10/2022 | Liang | G06V 20/44 |
| 2023/0267335 | A1* | 8/2023 | Nitzan | G06N 3/047 706/25 |

OTHER PUBLICATIONS

Yilmazer et al., "Shelf Auditing Based on Image Classification Using Semi-Supervised Deep Learning to Increase On-Shelf Availability in Grocery Stores," Sensors, MDPI. Jan. 6, 2021, 26 pages.
Moorthy et al., "Applying Image Processing for Detecting On-Shelf Availability and Product Positioning in Retail Stores," ResearchGate. Aug. 2015, 8 pages.
Jha et al., "Designing an Efficient End-to-end Machine Learning Pipeline for Real-time Empty-shelf Detection," ArXiv. May 25, 2022, 15 pages.

* cited by examiner

MODEL DESIGN AND EXECUTION FOR EMPTY SHELF DETECTION

CROSS-REFERENCE TO RELATED APPLICATION

The instant application claims the priority benefit of U.S. provisional application 63/308,387, filed on Feb. 9, 2022, the contents of which are incorporated by reference herein in their entirety.

BACKGROUND

On-Shelf Availability (OSA) of products in retail stores is a critical business criterion in the fast moving consumer goods and retails sector. When a product is out-of-stock (OOS), a customer cannot find it on its designated shelf, this causes a negative impact on the customer's behaviors and future demands. Several methods are being adopted by retailers today to detect empty shelves and ensure high OSA of products, including manual audits, RFID and image-processing based techniques; such methods are generally ineffective and infeasible since they are either manual, expensive or less accurate. Recently machine learning based solutions have been proposed, but they suffer from high computation cost and low accuracy problem due to lack of large annotated datasets of shelf products, which are typically used for training such machine learning based solutions.

SUMMARY

Figure 1:
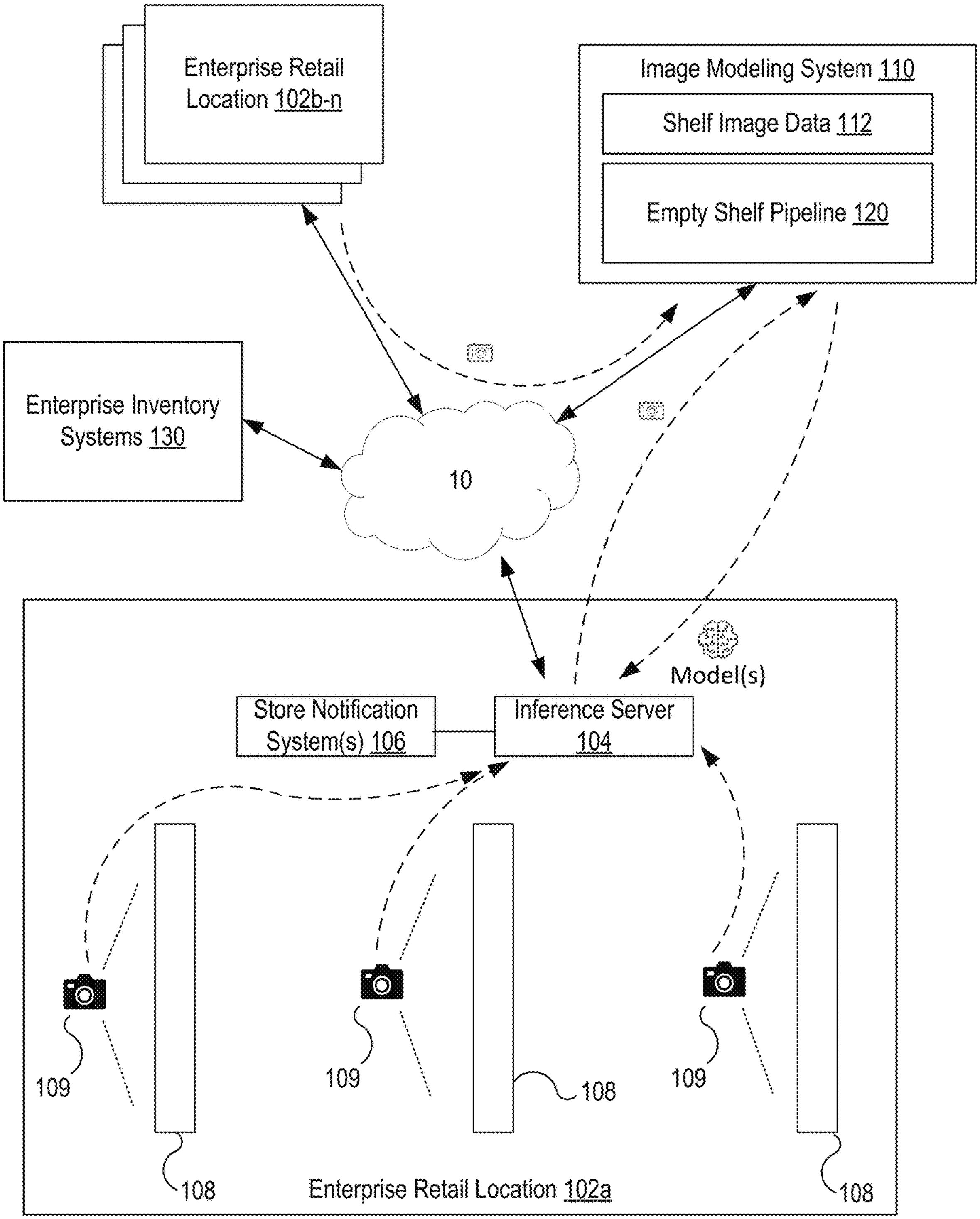
FIG. 1 is a schematic view of a system for operating an on-site model that is reusable across multiple product displays in real time.

According to an embodiment, a system for real-time, on-site empty shelf detection, the system includes cameras configured to capture corresponding images at a plurality of product displays at a retail environment. The system includes an in-store computing system configured to receive the images from the plurality of cameras. The in-store computing system includes a memory storing a machine learning model for empty space detection and a processor configured to implement the machine learning model to analyze the images and annotate the images with indications of empty space therein. The machine learning model is configured to determine a quantity of empty space at the plurality of different product displays corresponding to the images from the plurality of cameras.

The processor can be configured to conduct a drift analysis by either adjust a frequency of imaging by the at least one camera or by causing the machine learning model to be updated upon detecting a predetermined threshold of drift. Annotating the image with the indication of an empty space comprises annotating the image with a flat face representing a front of an empty shelf section. The quantity of empty space at the product display can be a volume of a cuboid region on the product display behind the flat face. Annotating the image with the indication of an empty space can involve annotating the image with a flat face representing a back end of the empty shelf section. The system can include an image modeling system remote from the retail environment, the image modeling system communicatively coupled to the inference server and comprising a model development pipeline that includes a data cleaning pipeline stage that is executable on the one or more in-store computing systems to create a filtered data set of image samples of a retail shelf, the image samples meeting predefined quality criteria, a data annotation pipeline stage that is executable on the one or more in-store computing systems to receive annotations of the filtered data set of image samples identifying one or more empty locations, a model training pipeline stage that is executable on the one or more in-store computing systems to form a trained model usable to identify empty shelf regions, the trained model being based on the filtered data set of image samples and associated annotations, and an inference optimization pipeline stage that is executable on the one or more in-store computing systems to perform one or more quantization or pruning operations on the trained model. The model deployment platform can be configured to receive, in a realtime data stream, one or more shelf camera images from cameras installed at the retail location; and generate an output data stream indicative of shelf and product availability information based on the trained model generated via the model development pipeline. Determining the type of aisle corresponding to the at least one image comprises determining a type of product located at the aisle. The type of product can be one that is stacked on a shelf or arranged on a hanger.

According to another embodiment, a method for empty shelf detection can include detecting, by a plurality of cameras each arranged at a retail location, an image corresponding to a corresponding plurality of product displays. The method includes sending the images corresponding to the plurality product displays to an in-store computing system in realtime; implementing a machine learning model to analyze the image and annotate the images with indications of an empty space, determining a quantity of empty space at the plurality of product displays corresponding to the images, and adding a product to the product display at a location corresponding to the empty space.

The method can further include conducting a drift analysis by either adjusting a frequency of imaging by the at least one camera or by causing the machine learning model to be updated upon detecting a predetermined threshold of drift. The method can further include annotating the image with the indication of an empty space comprises annotating the image with a flat face representing a front of an empty shelf section. The quantity of empty space at the product display can be a volume of a cuboid region on the product display behind the flat face. Annotating the image with the indication of an empty space further can include annotating the image with a flat face representing a back end of the empty shelf section. The quantity of empty space at the product display is a volume of a cuboid region between the flat face representing the front of the empty shelf section and the flat face representing the back end of the empty shelf section.

Determining the type of aisle corresponding to the at least one image can include determining a type of product located at the aisle. The type of product located at the type of aisle can be one that is stacked on a shelf. The method can include obtaining the machine learning model from an image modeling system remote from the retail environment, the image modeling system communicatively coupled to the inference server and comprising a model development pipeline that includes: a data cleaning pipeline stage that is executable on the one or more in-store computing systems to create a filtered data set of image samples of a retail shelf, the image samples meeting predefined quality criteria; a data annotation pipeline stage that is executable on the one or more in-store computing systems to receive annotations of the filtered data set of image samples identifying one or more empty locations; a model training pipeline stage that is executable on the one or more in-store computing systems to form a trained model usable to identify empty shelf regions, the trained model being based on the filtered data set of image samples and associated annotations; and an inference optimization pipeline stage that is executable on the one or more in-store computing systems to perform one or more quantization or pruning operations on the trained model. The model deployment platform can be configured to receive, in a realtime data stream, one or more shelf camera images from cameras installed at the retail location; and generate an output data stream indicative of shelf and product availability information based on the trained model generated via the model development pipeline.

According to another embodiment, a real time empty shelf detection system can include one or more in-store computing systems at a retail location, the one or more in-store computing systems implementing a model development pipeline and a model deployment platform. The model development pipeline includes a data cleaning pipeline stage that is executable on the one or more in-store computing systems to create a filtered data set of image samples of a retail shelf, the image samples meeting predefined quality criteria; a data annotation pipeline stage that is executable on the one or more in-store computing systems to receive annotations of the filtered data set of image samples identifying one or more empty locations; a model training pipeline stage that is executable on the one or more in-store computing systems to form a trained model usable to identify empty shelf regions, the trained model being based on the filtered data set of image samples and associated annotations; and an inference optimization pipeline stage that is executable on the one or more in-store computing systems to perform one or more quantization or pruning operations on the trained model. The model deployment platform is configured to receive, in a realtime data stream, one or more shelf camera images from cameras installed at the retail location; and generate an output data stream indicative of shelf and product availability information based on the trained model generated via the model development pipeline.

Generating an output data stream indicative of shelf and product availability information based on the trained model generated via the model development pipeline can include annotating the one or more shelf camera images from the cameras installed at the retail location with a flat face corresponding to the empty shelf regions therein.

DETAILED DESCRIPTION

An Out-of-Stock (OOS) occurrence refers to a situation when a customer at a retail store wants to buy a product that is not currently available at its designated shelf OOS conditions result in losses and customer disappointment. Whenever the OOS issue repeats continuously, there is a significant risk that the customer may go to another store with OSA of their needed products. OOS can have significant impact on the business profit and it has become an integrated measure of retailer's performance given its labor, processes and technology.

Retail enterprises endeavor to avoid OOS conditions whenever possible, such as by monitoring quantities of inventory that are received, sold, returned, and broken or otherwise removed from the available inventory, to infer remaining stock. Other ways of determining quantities of stock available include manual counting by retail associates. These solutions also fail to solve the problem of tracking inventory that is in a shopping cart or has been placed at the wrong location in the store. In such situations a shelf may be empty, even while inventory records show that the product is in stock. To a shopper, the fact that the product has not yet been sold is not nearly as relevant as the fact that it is no longer available on the shelf.

Various technical solutions have been proposed that use sensors to detect the presence and quantity of products that are available for purchase. Such technical solutions can leverage Radio Frequency Identification (RFID) and RFID reader integrated weight sensing mats, ZigBee transceivers, high quality depth sensors, or requesting that customers scan a QR code to alert the store of OOS conditions, for example.

These methods are either manual or not cost-effective to integrate into existing systems. There have also been proposal to address the OOS issue using image processing and traditional machine learning algorithms such as using supervised learning using Support Vector Machines (SVM), blob detection followed by discriminative machine learning, 3D point cloud reconstruction and modeling, and computer vision. Nevertheless, such traditional Machine Learning (ML) approaches have low accuracy even using larger datasets and are difficult to make better. To address the low accuracy of such methods, there exists some recent work leveraging deep learning approaches to address the issue of shelf-OOS. Some recent works have focused on product detection to demonstrate object detection in densely packed scenes. When a deep learning (DL) approach is used, comparatively higher accuracies have been achieved. However, since DL methods require labelled samples for training, a huge manual effort is required to properly annotate products on retail shelves for building a DL-based predictive model.

A more straightforward approach, which does not require such labor-intensive and manual efforts, is to look for empty space rather than looking for the labelled items. Additionally, the output of an empty-space detection scheme is more relevant to the consumer. Consumers generally do not care how much of a product is available, as long as the shelves are not empty, and the emptiness of a shelf is not quickly and efficiently determined using conventional approaches.

FIG. 1 is a schematic view of a system for operating an on-site model that is reusable across multiple product displays in real time.

According to FIG. 1, a network 10 couples an enterprise retail location 102*a* with other enterprise retail locations 102*b*—n, a central image modeling system 110, and an enterprise inventory system 130.

Enterprise retail location 102*a* detects OOS conditions on product displays 108 using a corresponding set of cameras 109. Although enterprise retail location 102*a* is connected to network 10, in operation most of the OOS detection is conducted within the enterprise retail location 102*a* itself, that is, within a single network location or local area network. In some embodiments OOS detection can be carried out even within individual cameras 109, handheld devices operated by store associates, or the like.

Cameras 109 collect images of product displays 108 in real time, either continuously or occasionally (such as every few minutes, every few hours, or every few days). The images are sent to inference server 104 for comparison to an empty space detection model. Depending upon the comparison of the images from cameras 109 with the model at the inference server 104, a store notification system 106 can be implemented to alert store associates when there are product displays 108 with OOS sections.

Over time, the model at inference server 104 may lose fidelity with the products on product displays 108. The model at inference server 104 is compact enough to be trained with a relatively small number of images and can therefore be implemented using locally-available resources within enterprise retail location 102*a*. Therefore as product packing, display arrangement, restocking with new or different products, seasonal or other display changes, or changes in camera positioning, lighting, or hardware occur, the model may not be as accurate. This type of change is referred to as drift. Drift analysis is used to determine when the model is no longer sufficiently accurate or precise.

One major challenge for a real world ML system deployment and application lies in the model performance degradation issue due to change in dataset distribution over time. A deep learning model is trained and developed on historical collected dataset, assuming a static relationship between input and output variables, and the future application data will have a similar distribution as the training data. In reality, deployed machine learning model for a real world application/product runs in a dynamic environment, where not only the incoming application data streams keep changing due to real world environment factors, so does the input-output mapping; the application data and training data mismatch in real world deployments. As a result, the performance of the deployed machine learning model starts deteriorating over time and become increasingly incorrect and unreliable, due to difference in the distributions of training data and the application (inference) data, this phenomenon is termed as "model drift". If model drift is not detected in time, it can have detrimental effects on deployed service and application pipelines. Although there has been tremendous efforts to build and train deep learning models using big data, it is hard to find research works focused on how to handle deep learning model drifts in real world products/applications.

When drift analysis indicates that the model is no longer appropriately accurate and precise, the model should be updated. Updating the model takes significantly more computational resources than implementing the model at inference server 104. While updating the model therefore can theoretically occur within enterprise retail location 102*a*, such as by using excess computing capacity, it is often the case that the inference server 104 will communicate, via the network 10, with a remote image modeling system 110. The image modeling system can store shelf image data 112 from the enterprise retail location 102*a*, and carry out an empty shelf pipeline 120 (described in more detail with respect to FIG. 2) to set up an updated model that accounts for the drift and is more accurate than the original model.

Often retail enterprises include multiple retail locations. In addition to enterprise retail location 102*a*, a large number of additional enterprise retail locations 102*b-n* can also implement their own local, real-time OOS detection system. By operating each system locally, several benefits are obtained. First, there is significantly less network traffic than if all images were sent to a central location for analysis. Second, each enterprise retail location 102*a-n* can have its own model that is more accurate for the types of product displays, cameras, computational resources, and other attributes of the individual enterprise retail location.

Enterprise inventory systems 130 can also be coupled to each of the individual enterprise retail locations 102*a-n* through network, for purposes of reordering product that is out of stock. In embodiments, enterprise inventory systems 130 can also include details of products that are being shipped to stores, including information about changes to packaging or sizing for products that can be used in image modeling system 110.

It should be understood that FIG. 1 shows a simple system, and that in practice there may be multiple cameras 109 or additional computing components not shown in this simplified version of enterprise retail location 102*a*. There may be multiple types of cameras 109, such as cameras mobile and stationary, or different versions with different types of lenses that show different types of image, or even systems of cameras 109 that are used in conjunction with one another to get a complete view of a product display. Cameras 109 could be connected to the inference server 104 via a mesh network rather than directly. Additional components such as handheld devices used by store associates could be connected to the store notification system 106, as could one or more displays for review of potential OOS images or input to further refine a training model stored at inference server 104.

According to one embodiment of FIG. 1, a real time empty shelf detection system can include an inference server 104 that includes one or more server computing systems implementing a model development pipeline and a model deployment platform developed at image modeling system 110. The model development pipeline can include a data cleaning pipeline stage that is executable on the one or more server computing systems to create a filtered data set of image samples of a retail shelf, the image samples meeting predefined quality criteria. The model development pipeline can further include a data annotation pipeline stage that is executable on the one or more server computing systems to receive annotations of the filtered data set of image samples identifying one or more empty locations. The model development pipeline can further include a model training pipeline stage that is executable on the one or more server computing systems to form a trained model usable to identify empty shelf regions, the trained model being based on the filtered data set of image samples and associated annotations. The model development pipeline can further include an inference optimization pipeline stage that is executable on the one or more server computing systems to perform one or more quantization or pruning operations on the trained model. The model deployment platform can be configured to receive, in a realtime data stream, one or more shelf camera images from cameras installed at one or more retail locations. The model deployment platform can generate an output data stream indicative of shelf and product availability information based on the trained model generated via the model development pipeline.

In embodiment, the annotations comprise user entered annotations on the filtered data set of image samples. The filtered data set of image samples can include a significant number of images, such as least 800 images in one embodiment. The model training pipeline stage can form a plurality of trained models, each of the plurality of trained models having a different structure and/or size relative to one another.

The model used at inference server 104 should have good accuracy for many types of products that could be displayed. The model stored at inference server 104 can be trained for different types of aisles, such as those with shelved products, hanging products, aisles with bins of products, or any other arrangement. The model can reduce computational resources required by varying frequency of operation. For example, an image may be analyzed for high-turnover or high-importance products continuously, or every minute or less. An image may be acquired for a typical product every 10 or 15 minutes. Some products with very low turnover may be analyzed daily or weekly.

The model stored at inference server 104 can determine data drift. That is, the model stored at inference server 104 can determine not only missing quantity of product from a product display but also determine specific types of items that are missing based on shelf location. For example, in a toy aisle there may be 0.1% missing stock, but that 0.1% may correspond to a product of particular importance or distinction from the other items in the same display. The model can therefore determine, in embodiments, which type of aisle it is analyzing and in some cases which types of products correspond to that type of aisle, and adjust frequency of imaging accordingly.

As briefly described above, embodiments of the present invention are directed to an end-to-end ML pipeline for real time empty shelf detection to address the OOS problem and ensure high OSA. Considering the strong dependency between the quality of ML models and the quality of data, we focus the first three stage of our ML pipeline on improving the data quality, before delving into modeling. To make this solution efficient for real-time predictions, the systems and methods described herein use state-of-the-art real time object detection model architectures, followed by inference run-time optimizations for different computing devices to improve performance.

In general terms, the methods and systems described herein include use of a data collection process, followed by a data cleaning sequence. A data annotation process may add labels to the cleaned image data, with the labeled, cleaned images being used in a model training process. An inference optimization process is then performed, followed by model deployment. A feedback mechanism from deployed models may be used for performance monitoring, for example to determine the presence of data drift.

Within the data cleaning process, a set of operations may be performed on received image data, including assessment of border alignment, irregular product shapes, missing views, and the like.

Within the data annotation process, annotations are made to label areas including empty shelves. Empty shelf annotations are visualized as a three-dimensional box having a height and a depth. Each empty location may be considered one or more empty locations; the areas in which multiple empty locations are adjacent to each other may be considered a single empty location for purposes of annotation.

Within the model training process, one or more different deep learning models may be used, alongside a configurable number of training images. In examples, between 50 and 800 images are included within a training data set. In still further examples, more than 800 training examples may be used. The model should be implementable on a machine with limited amounts of memory, such as 7 Mb. In some embodiments, the model may be simple enough to be operated by a camera itself.

This memory can be scaled depending upon available resources. Determining the appropriate memory requirement for model deployment can significantly impact the model performance, including both latency and throughput. Likewise, installing a powerful GPU across an entire retail enterprise, which can include thousands of retail stores, is not financially suitable. Offsite processing of images against the model is not a good solution because transmitting the shelf images continuously from retail stores to the data centers would require significant bandwidth and processing. These images generally have large file size, and upgrading network bandwidths in retail stores to handle significant quantities of such files would be infeasible for most retain enterprises. Model sophistication can be increased to a level appropriate to the computational resources available at the store. Computational efficiency is also improved by carrying out the analysis in-store because shelf arrangements may not be consistent between stores, and camera positioning often cannot be controlled between stores.

Ultimately, transmitting the images from stores to a central location is not necessary when using the systems and methods described herein. The model can be trained simply to determine which aisles or shelves are empty, and on-site resources such as store associates can determine what should be restocked. Focusing solely on whether a shelf is empty or not is computationally efficient enough that offsite processing is not required.

Additionally, various examples, different training parameters may be applied, and may be tunable by a user to achieve improvements in performance. In particular, different versions of a model that use different numbers of repetitions, or different numbers or sizes of model architectures may be selected.

Within the inference optimization process, various inferences may be applied, such as quantization and pruning.

Within the feedback mechanism, various additional processes may be performed to ensure maintained high performance of the deployed model. For example, as monitored performance degrades, captured images may be provided to the overall pipeline for retraining, or adjustment of model parameters.

Figure 2:
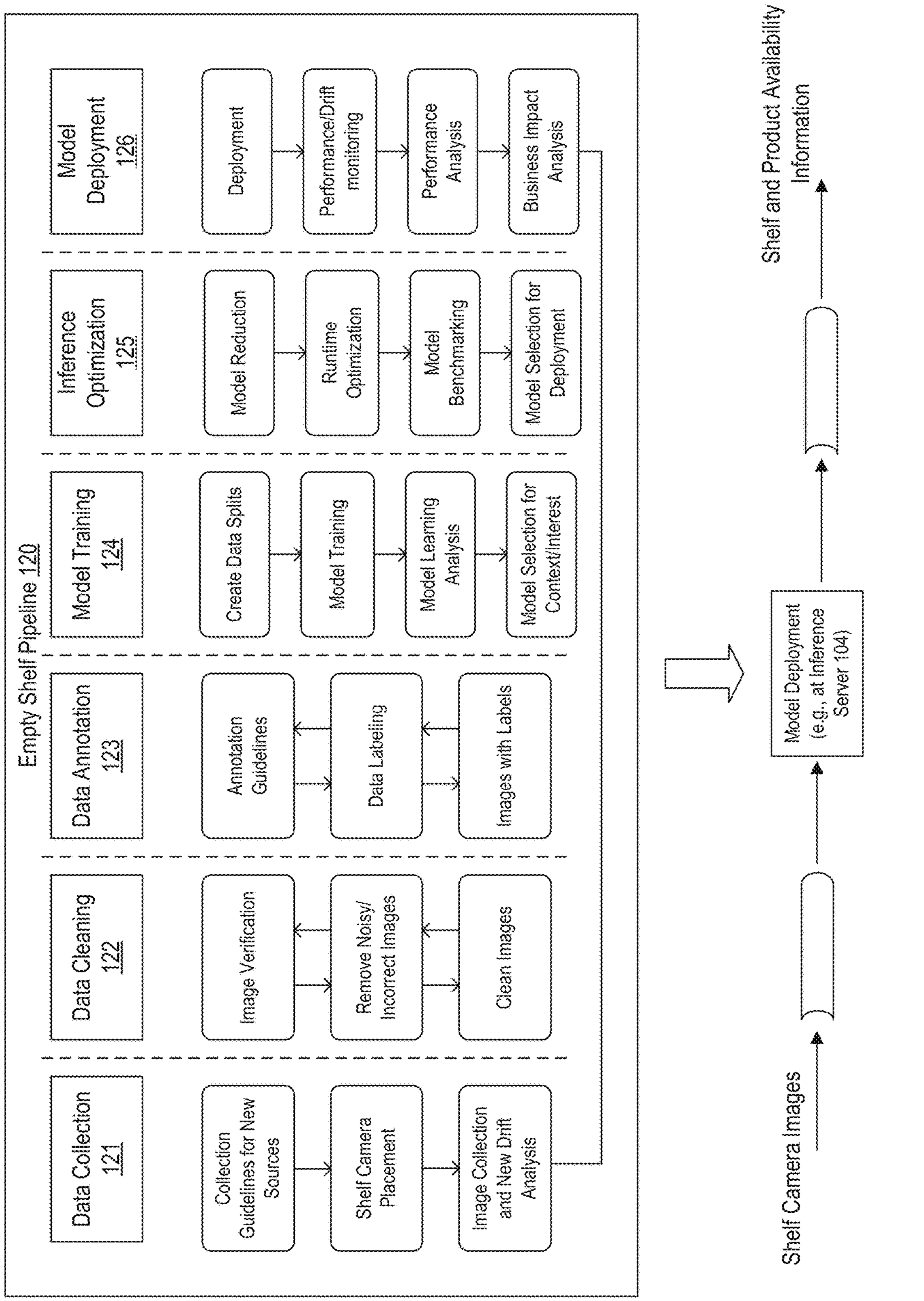
FIG. 2 shows a method for use of an empty shelf pipeline to monitor shelf and product availability.

FIG. 2 shows an empty shelf pipeline 120 as described briefly above. Empty shelf pipeline 120 includes data collection 121, data cleaning 122, data annotation 123, model training 124, inference optimization 125, and model deployment 126. Empty shelf pipeline 120 can input shelf camera images and output shelf and product availability information.

Considering the strong dependency between the quality of ML models and the quality of data, empty shelf pipeline 120 emphasizes data collection 121, data cleaning 122, and data annotation 123 before modeling. Since an empty-shelf detection solution should be computationally-efficient for real-time predictions inside retail stores, such approaches improve run-time optimizations at inference optimization 125 to improve the model performance when deployed at model deployment 126.

A primary challenge in the application of deep learning models within the retail field remains to be accessibility and availability of good quality data. A predictive application based on ML is a software artifact compiled from data collected at data collection 121. The biggest perceived problem in ML revolves around data collection 121 and preprocessing, collecting, cleaning, and annotating. The accuracy of dataset deals with correctness and reliability, the completeness stands for inclusivity of real world scenarios, consistency deals with rules followed for data collection and preparation, and timeliness deals with whether the data is up to date for the task. Although, there are some datasets collected in retail stores, such as SKU-110k and WebMarket, they lack data quality measured across all four dimensions.

In data collection 121, product display images are obtained. There can be deviations between images. For example, if proper guidelines are not followed for camera placement and camera settings. For example, some cameras can have fish-eye distortions, variations in positioning of the lenses, and various zoom levels; these distortions cannot be compensated using planar projections. Images can be collected at data collection 121 following a set of rules. For example, (1) Align the camera position parallel to the shelf so that the image borders are parallel to the shelf. If all borders can not be properly aligned, try to align the left and bottom sides.

(2) Fix the camera position and focal length so that it captures full shelf height, from top to bottom.

(3) Collect shelf images from several different times of weekdays and weekends from several locations in the United States, such that the dataset contains rich data distributions of empty shelves. Shelves are generally filled during the early morning and get empty during the late evening.

(4) Collect multiple shelf images for the same shelf positions at different times such that the dataset captures different products versus empty representations for the same shelf. Different shelves can have different lengths and heights; while some shelves could be completely covered by 3 consecutive image frames, others required more image frames.

These or other guidelines can be used or updated based upon the type of retail enterprise and the types of product displays that are being monitored for OOS conditions.

Moving on to data cleaning 122, following a proper well-defined data collection guideline is important for building a real-world machine learning solution. Data cleaning 122 can not only avoid noisy image collection, but also helps in reducing human efforts required for further data collection and data cleaning. However, since the data collection was performed manually in a real retail environment, the collected data may still contain some images that narrowly missed the data collection guidelines. Some examples include images with poor border alignments, images containing irregular product shapes, images not having enough top view, images with people shopping (though automatic detection and shutoff of cameras can also be implemented to avoid this), and so on.

Data annotation 123 is used on images that are obtained and cleaned at 121 and 122. Annotation 123 is used for empty-shelf detection rather than product detection in this disclosure. This approach tremendously decreases human efforts needed for data annotations at 123 as well as model computation time.

To annotate empty shelves, first the term empty shelf must be well defined. For example, the height of an empty location on the top shelf may be ambiguous and need definition. The model should also not annotate empty locations above products in some circumstances. The bounding box corners for products placed in tilted positions or tilted images may affect annotation. Data annotation 123 should also know how to handle with a large empty location and determine if it is one empty space or multiple. Empty sections that span two camera frames should also be addressed. Small gaps between two products may be annotated in some product displays but not others.

Figure 3:
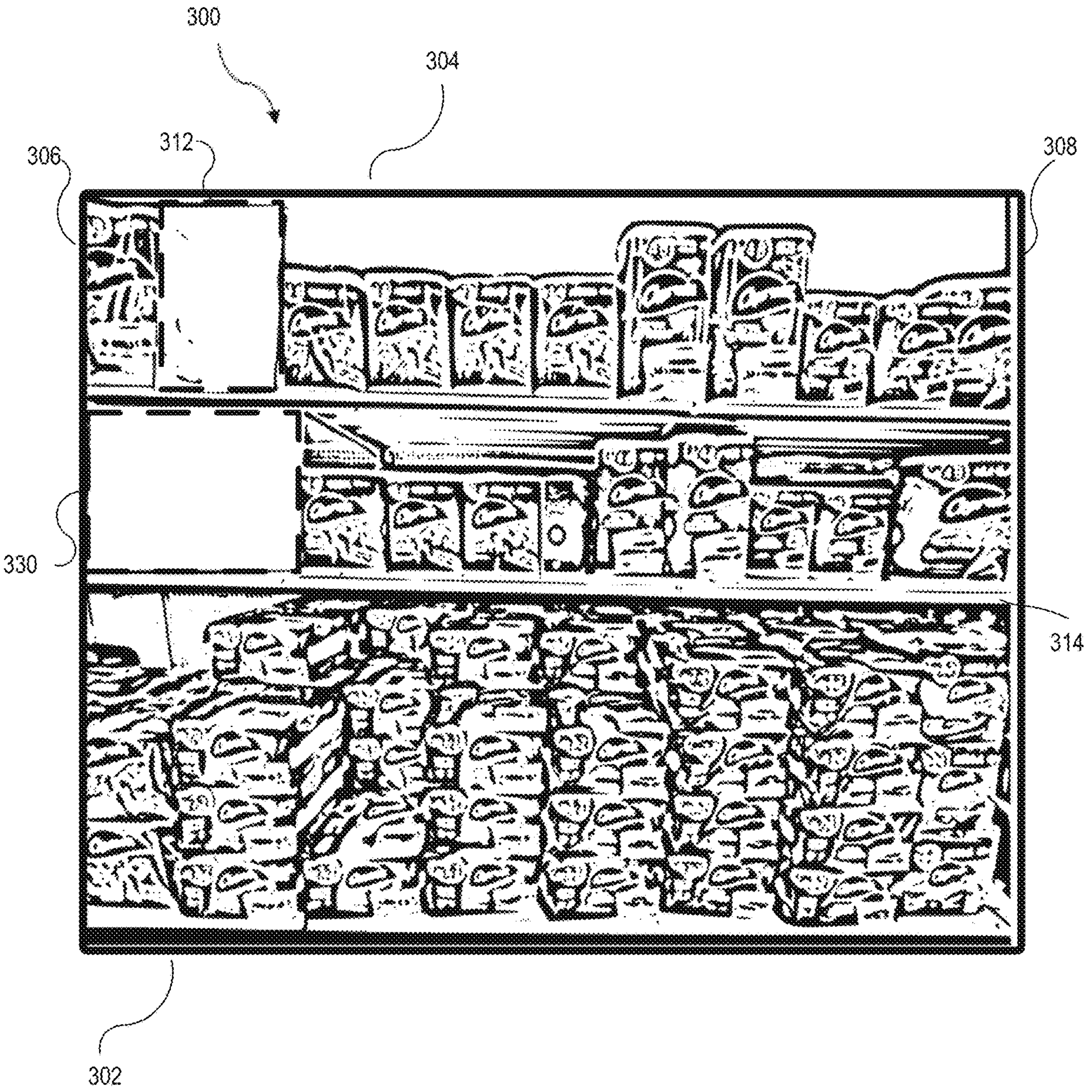
FIG. 3 is an image of a shelf annotated with detected empty portions indicated therein.
Figure 4:
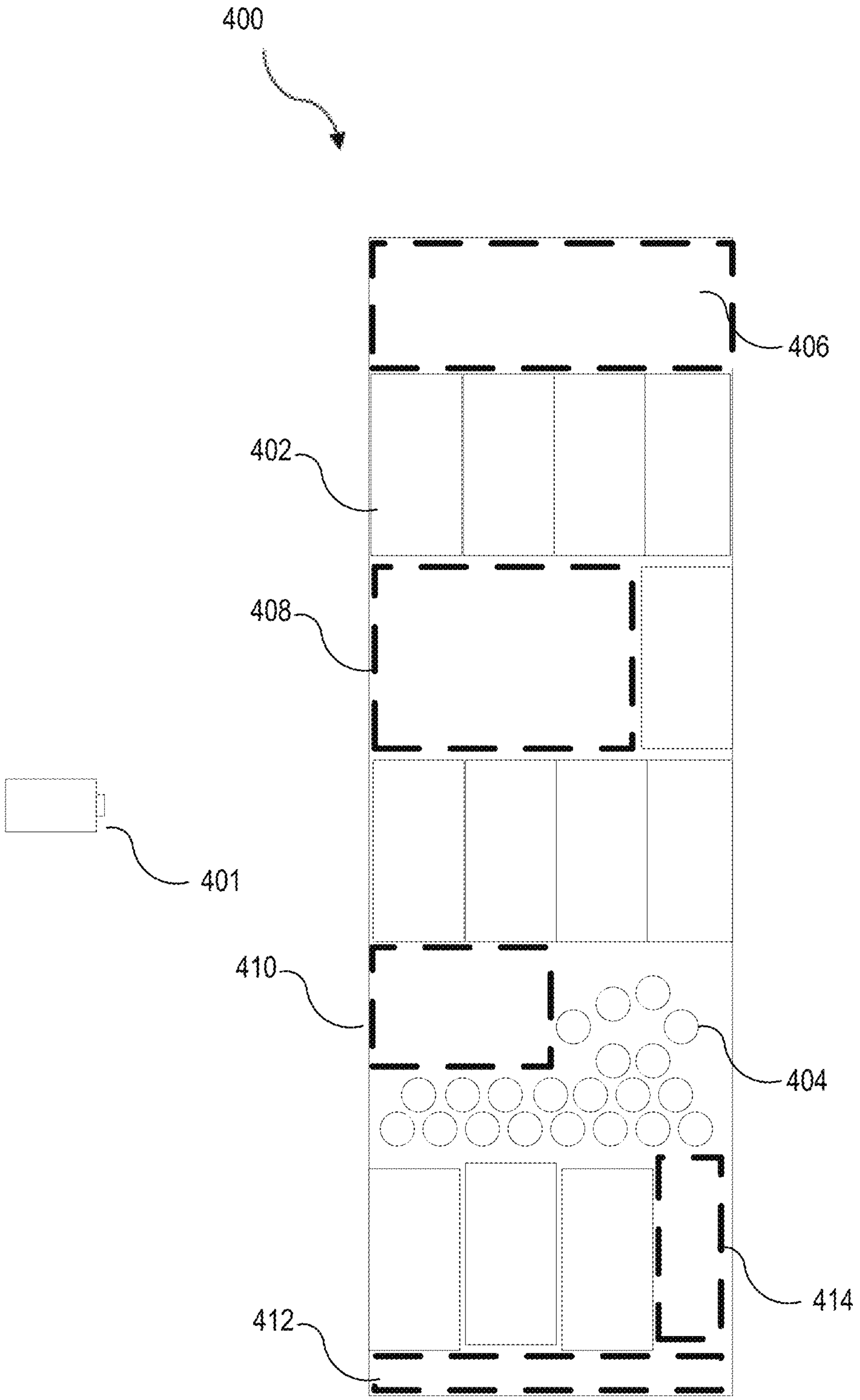
FIG. 4 is a schematic view illustrating different types of empty shelf regions indicated therein.
Figure 5:
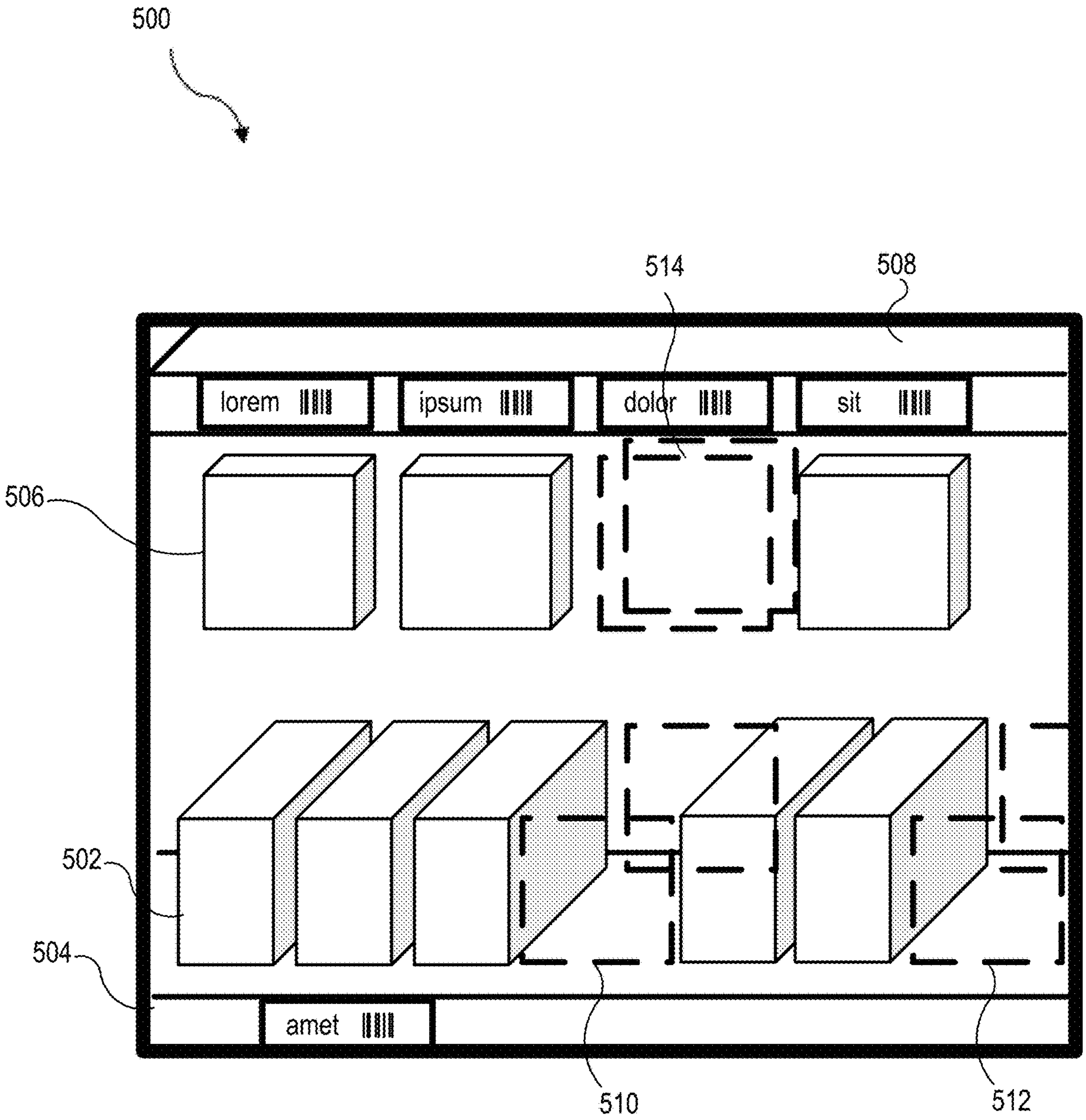
FIG. 5 is an image of a shelf annotated with detected empty portions indicated thereon.

To eliminate such ambiguities, we limit the annotations to well-defined concepts and established clear annotation guidelines as follows:

(1) Empty locations are created when a product is removed from its place by a customer. Since a product is 3D, we visualize an empty location as a 3D box to decide how to label the bounding box coordinates. Since bounding boxes are limited to 2D, we visualize the empty location as a 3D box and label the front face of the 3D box as shown in FIGS. 3-5.

(2) Empty locations have different heights or depths. When multiple products are placed on top of each other or horizontally next to each other from back to front, partially empty locations are created.

(3) The empty location can be considered as multiple empty locations. When two adjacent products are removed, it creates a wider empty location. To avoid such confusion with labeling, a continuous empty location can be labeled as a single empty location with one single bounding box.

(4) Sometimes there are small empty spaces between products because nothing can be placed there. To avoid such confusion, the width of the labeled empty location can be annotated if it is at least half the size of the neighboring existing product.

(5) When a shelf image contains several products along with empty locations, since the focus is on empty locations, products are not labeled. This approach tremendously reduces the efforts required for data annotation 123.

Model training 124 can use deep neural network architectures that are computationally-efficient for real-time empty shelf detection models. Model training 124 starts from a small training set containing about 50 samples in one example. Hyperparameters are optimized for each model at each training dataset size using grid search over learning rate, learning rate patience, and batch size. To further utilize the capability of our models, data augmentation borrowed from ScaledYOLOv4 with multiple augmentation settings from a combination of left-right flipping, rotations of the image, image translations, and random perspectives can be used. Different approaches can be used for transfer learning from a pretrained EfficientDet-D0 model on MSCOCO—freeze the BiFPN, freeze the BiFPN+, EfficientNet, and train all model layers. All models can be trained using AdamW optimization algorithm for 500 epochs using a patience of 30 for early stopping. The validation and test sets are fixed independent of the training set size.

The models with the best performance are selected on the validation set; since the precision and recall both are important for our application, models are selected using the following metrics: mean average precision (mAP @[IOU=0.50:0.95|area=all|maxDets=100]), mean average recall (mAR@[IOU=0.50:0.95|area=all|maxDets=100]), and mean average F1-score (mAF) computed using previous two metrics.

It was found that there is almost a linear increase in model performance with a logarithmic increase in training set size. The best models were generally ones leveraging data augmentation and slightly vary based on performance metric. For smaller training data, we observe that the smaller variants of EfficientDet-DO perform better than the EfficientDet-DO model. As the training size is increased, the model capacity comes into play; in fact, we observe that the performance, though similar for all variants, depends directly on the model size. The model size decreases in the following order—EfficientDet-D0a, EfficientDet-D0b, EFficientDet-D0c, and EfficientDet-D0d. The latter two have the same model architecture but differ in input resolution. Comparing these two models, we observe the performance lines are parallel to each other for all three metrics; higher input resolution provide more input features for the models to learn from and hence, perform better. Note that the model learning capabilities are not fully saturated with the largest training set containing 800 images in an initial dataset and it is expected that updates in data collection quantity and type could lead to further improvement beyond the details described above.

At model deployment, the model is deployed to a retail store and then performance and drift are monitored. A performance analysis can be conducted to determine whether performance or drift indicate that the model is no longer suitable for the environment in which it is deployed. This analysis can be conducted through a business impact analysis that considers which OOS areas are being accurately detected.

FIG. 3 illustrates an example of such detected empty space. FIG. 3 is a photograph 300 having a lower edge 302, upper edge 304, left edge 306, and right edge 308. Within photograph 300, a first empty space 310 and second empty space 312 have been identified by an empty space detection system (e.g., inference server 104 as described with respect to FIG. 1). Shelves 314 can be seen in photograph 300, and products are arranged on the shelves 314.

| Model | Params (M) | Input Size | Validation - mAP | Validation - mAR | Validation - mF | Test - mAP | Test - mAR | Test - mAF |
|---|---|---|---|---|---|---|---|---|
| EffecientDet-D0d | 3.65 | 256 | 49.1 | 59.0 | 53.6 | 48.4 | 57.6 | 52.8 |
| EffecientDet-D0c | 3.65 | 512 | 53.3 | 62.7 | 57.6 | 55.1 | 63.1 | 58.8 |
| EffecientDet-D0b | 3.68 | 512 | 56.6 | 64.3 | 59.8 | 54 | 63 | 58.2 |
| EffecientDet-D0a | 3.73 | 512 | 55.9 | 65.6 | 60.3 | 55.6 | 63.6 | 59.3 |
| EffecientDet-D0 | 3.83 | 512 | 56.6 | 66.3 | 61.0 | 55.3 | 64.0 | 59.3 |
| EffecientDet-D1 | 6.55 | 640 | 57.9 | 66.4 | 61.9 | 57.0 | 63.8 | 60.2 |
| EffecientDet-D2 | 8.01 | 768 | 49.0 | 59.7 | 53.8 | 50.4 | 60.7 | 55.0 |
| YOLOv5n | 1.76 | 640 | 66.2 | 76.7 | 71.1 | 63.8 | 74.0 | 68.5 |
| YOLOv5n6 | 3.09 | 1280 | 68.3 | 78.9 | 73.2 | 66.9 | 76.3 | 71.3 |
| YOLOv5s | 7.01 | 640 | 66.0 | 76.2 | 70.8 | 66.5 | 74.7 | 70.4 |
| YOLO5s6 | 12.31 | 1280 | 68.0 | 77.0 | 72.2 | 66.4 | 73.9 | 69.9 |
| YOLO5m | 20.85 | 640 | 68.9 | 75.4 | 72.0 | 65.3 | 72.8 | 68.8 |
| YOLOv5m6 | 35.25 | 1280 | 67.3 | 75.4 | 71.1 | 64.3 | 72.9 | 68.3 |
| YOLOv5l | 46.11 | 640 | 67.7 | 74.8 | 71.1 | 66.0 | 73.3 | 69.5 |
| YOLOv5l6 | 76.12 | 1280 | 69.2 | 77.1 | 72.9 | 65.9 | 73.7 | 69.6 |
| YOLOv5x | 86.17 | 640 | 66.5 | 76.3 | 71.0 | 66.9 | 74.4 | 70.5 |
| YOLOv5x6 | 139.97 | 1280 | 67.7 | 75.7 | 71.5 | 65.8 | 73.2 | 69.3 |

A model that is computationally-efficient is selected for optimization at 125. Performance trade-offs are inherent when deploying a model for in-production inference. Beyond the model metrics, the available computing resources and the network bandwidth in the deployment environment must be considered. Inference optimization 125 can use analysis of latency and throughput of the models using different inference run-time optimizations to determine which model is appropriate for deployment on the GPUs in the data centers and the CPUs available in the retail stores. Latency and throughput using different quantization and run-time optimization frameworks can be analyzed including PyTorch (model training framework) for both NVIDIA A100 GPU and Intel Xeon Gold CPU, for example.

Generally, the model performance should increase with an increase in model parameters since that means an increase in learning capability, provided the dataset is large enough. For a typical model using a small training set appropriate for use in individual retail stores, however, it is not expected that the performance will necessarily improve with an increase in model parameters. Rather, appropriate model size is really dependent upon the quality, size and complexity of the dataset. For a small and high-quality dataset, a large amount of training data is not needed to achieve great performance.

The number of model parameters is also an important criterion to consider before deployment since that determines the model size, and hence, the required amount of memory to run the model. In inference optimization 125, model reduction is conducted, as well as runtime optimization, to create a model benchmark. The model is then selected for deployment.

Lower edge 302, upper edge 304, left edge 306, and right edge 308 may be fixed based upon the location and orientation of a camera used to generate photograph 300. In some embodiments, such a camera can be mounted in a position to capture photograph 300. In other embodiments, photograph 300 can be captured by a mobile camera, such as a camera attached to an autonomous or robotic system that travels through a store.

There can be multiple issues with captured images if proper guidelines are not followed for camera placement and camera settings. For example, some cameras can have fish-eye distortions, variations in positioning of the lenses, and various zoom levels; these distortions cannot be compensated using planar projections. FIG. 3 shows images from a paper towels and tissue paper aisle, since these products have well-defined rectangular shapes with vertical boundaries; this makes the marking of the bounding boxes for first empty space 310 and second empty space 312 clearer.

In an example method for detecting empty space, the camera can be aligned parallel to the shelf so that the image borders are parallel to the shelf. If all borders cannot be properly aligned, the left and bottom sides can be aligned to promote accuracy and consistency. As described above, a camera position and focal length can be fixed so that the camera captures full shelf height, from top to bottom. Shelf images can be collected from several different times of weekdays and weekends from several locations, such that the dataset contains rich data distributions of empty shelves. Multiple shelf images for the same shelf positions can be collected at different times such that the dataset captures different products to compare against empty representations for the same shelf.

Different shelves can have different lengths and heights. While some shelves could be completely covered by three consecutive image frames, others required more image frames. Camera placement and image collection can be adjusted for the specific attributes of a given store or other retail environment.

With the lower edge 302, upper edge 304, left edge 306, right edge 308 and shelves 314 aligned as described above, first empty space 310 and second empty space 312 can be annotated. It should be understood that in alternative embodiments, any number of empty spaces could be annotated. Detecting empty spaces instead of trying to measure, track, or detect product is simpler computationally, requires less specialized equipment or data analysis.

To detect first empty space 310 and second empty space 312, parameters indicative of an empty space are defined. Empty locations are created when a product is removed from its place, such as by a customer in a store removing an item, and where no other item is placed in that space. While actual products have three dimensions that can have any contours, the systems and methods described herein rely on an abstraction of the empty location as a three dimensional box to decide how to label bounding box coordinates. Since bounding boxes are limited to two dimensions, first empty space 310 and second empty space 312 are visualized as empty locations as a three-dimensional box extending rearwardly from the front face thereof. The face is what is identified as corresponding to first empty space 310 and second empty space 312 in FIG. 3.

Empty locations have different heights or depths. When multiple products are placed on top of each other or horizontally next to each other from back to front, partially empty locations are created. First empty space 310 and second empty space 312 are completely empty locations—that is, locations empty from front to back and top to bottom of the shelf (top, bottom, front and back faces of the visualized 3D cuboid corresponding to the faces that identify first empty space 310 and second empty space 312 do not touch any product).

The empty location can be considered as multiple empty locations. When two adjacent products are removed, it creates a wider empty location. To avoid such confusion with labeling, the model described herein labels a continuous empty location as a single empty location with one single bounding box, though the dimensions of that bounding box may change depending upon how much shelf space has been emptied.

There may be small empty spaces present between products where nothing is placed. To avoid confusion, these spaces are not marked as empty spaces by ensuring the width of the labeled empty location is at least some portion of the size of a neighboring existing product. In some embodiments, to be labeled an empty space the region must be at least half the size of the neighboring existing product, for example.

Photograph 300 contains several products along with empty locations (first empty space 310 and second empty space 312). The empty detection system detects empty spaces where a model would expect full ones. By detecting empty locations rather than detecting and identifying products, it is not necessary to positively identify and label any product. This approach reduces the efforts required for data annotation, which permits photograph 300 to be analyzed quickly and accurately using the computational resources that are available at a typical retail location. That is, in FIG. 3 a system needs only to detect the existence of two things (the empty spaces 310 and 312) rather than having to detect the presence, location, and identity of hundreds of stocked items that are on the shelf.

FIG. 4 is a simplified top view of a product display 400 (in this case, a shelf partially covered in products) in front of a camera 401. Product display 400 is shown in a top view, looking down at the shelf. Product display 400 supports boxes 402 and cans 404, which are arranged in a typical array for a retail display. At least one row of products is missing, forming empty space 406. Another product has been partially removed to form empty space 408, which does not go to the back of product display 400. Similarly, cans 404 have been partially picked over, corresponding to an empty space 410. As additional cans 404 are removed, the size and location of empty space 410 may increase.

Empty space 412 may correspond to an actual OOS condition, or it may be an intentionally open space. A machine learning algorithm can be trained to identify which such empty spaces 412 are intentionally left open, and which correspond to an OOS condition.

Empty space 414 is behind some of the boxes 402 from the perspective of camera, and may not be detectable. In some contexts, however, empty space 414 at the rear of a display can be valuable information to a retailer regarding imminent OOS conditions. For example, in a dairy case products can be loaded into displays that push the remaining stock to the front of the shelf. In those circumstances, it may be valuable to know how far the back edge of the last product has been advanced. In some embodiments, multiple cameras can be used from different perspectives to obtain information from more than one side of the display. This can increase accuracy and can also be used to not only identify OOS conditions but also areas where an OOS condition is imminent.

As demonstrated by these six types of empty spaces (406, 408, 410, 412, and 414) what constitutes an empty space and how it is sized, results in multiple potential interpretations of what action, if any, might be required. A machine learning algorithm can be trained to determine whether any of these would be considered an empty space that needs restocking, and which are not of importance (e.g., empty space 212 which may be an intentionally unstocked area).

The data received from camera 401 can be labeled to imagine a 3D box or cuboid corresponding to the identified potential empty area. A machine learning model can be trained using clean training data that makes defining these boxes more accurate. Different types of stores can use customized training data that are specific to the type of shelf, or types of product sold. Many stores have immediately recognizable shelving or other product stocking that makes the training data from one incompatible with another, or at least less useful. Use of training data that is specific to the store or brand in which the system will be used can therefore be used to form a bespoke training data set. Even a few dozen images can then be sufficient to train the model to have a high level of success in determining which spaces are empty.

Many models are based on public data sets. Things like lighting, shelf height, distortions, fisheye, resolution, vary between the images used in the training data. While variety is generally useful in training machine learning algorithms, in this instance some types of variety are undesirable. If the training data contains variability that is based on things that are constant amongst the stores of a particular retail enterprise, then that variability will be unnecessary at best, and may actually introduce a higher error rate than if it were excluded. For example, shelves used in one retailer are very different from other retailers, so using training data that uses the type of shelf that is expected to be photographed will provide a stronger trained machine learning system.

Returning to FIG. 4, the modeled empty spaces 406, 408, 410, 412, and 414 are identified for a product display 400. The model creates three-dimensional images by stretching a three-dimensional box, bringing it to the front of the product display 400 (i.e., the portion closest to camera 401), and pushing the sides to the adjacent items (i.e., stretching the box upwards and downwards in the orientation shown in FIG. 4 until the sides touch the adjacent products). In some embodiments, the back of the three-dimensional box can also be determined, such as for empty spaces 408 and 410 which do not extend all the way to the back of the product display 400. In a simpler model, empty spaces are only set where the lack of product extends all the way to the back of the product display 400, such as empty spaces 406 and 412.

As shown above with respect to FIG. 3, only the front face of the three-dimensional box is annotated as corresponding to the empty space. The location of that annotated section can be communicated to appropriate manual or autonomous restocking personnel or software. For example, photograph 300 can be sent to a store associate upon detection of first empty space 310 and second empty space 312 to prompt the associate to determine which products should be in that location and begin the restocking process.

FIG. 4 depicts a product display 400 having a first type of product 402 at a first display section 404, and a second type of product 406 at a second display section 408. The first type of product 402 sits on a shelf in the first display section 406. Detecting empty spaces 410 and 412 in the first display section 406 is therefore similar to what has already been described with respect to FIG. 3.

In contrast, the second type of product 406 is a product that hangs from a shelf within the second display section 404. A machine learning algorithm can recognize where product is arranged and, based on those images, determine how the product is being displayed to accurately identify empty spaces. In addition to products that hang from a shelf, other examples could include stacked products, bins of products, hooks that hold products, or other known product arrangements and displays.

In addition to depicting the first type of product 402 and the second type of product 406, FIG. 4 shows first empty space 410, second empty space 412, and third empty space 414 (referred to collectively as "empty spaces 410-414"). Empty spaces 410-414 are found amongst both the first display section 404 and the second display section 408. The manner in which the machine learning algorithm detects the empty spaces 410-414 depends on which display section 404 or 408 the product is in.

Empty spaces 410, 412, and 414 can be different sizes and shapes depending upon the type of product (e.g., 402, 406) that is expected to be in that space by a machine learning algorithm.

As shown in FIG. 3, each empty space was annotated on the captured photographs 100 solely as a front face. In FIG. 4, in contrast, each empty space (410, 412, 414) is identified with a front face and a back face. In some embodiments, such as where depth of the empty space is important (e.g., for empty spaces 308, 310, and 314 shown in FIG. 3) the front and back of an empty space can be annotated and connected together to form a cuboid volume. This cuboid volume can be used in some implementations to determine a quantity of product that should be restocked, a type of product that is out of stock, or to determine whether a sufficient quantity of shelf is OOS such that restocking is needed.

Figure 6:
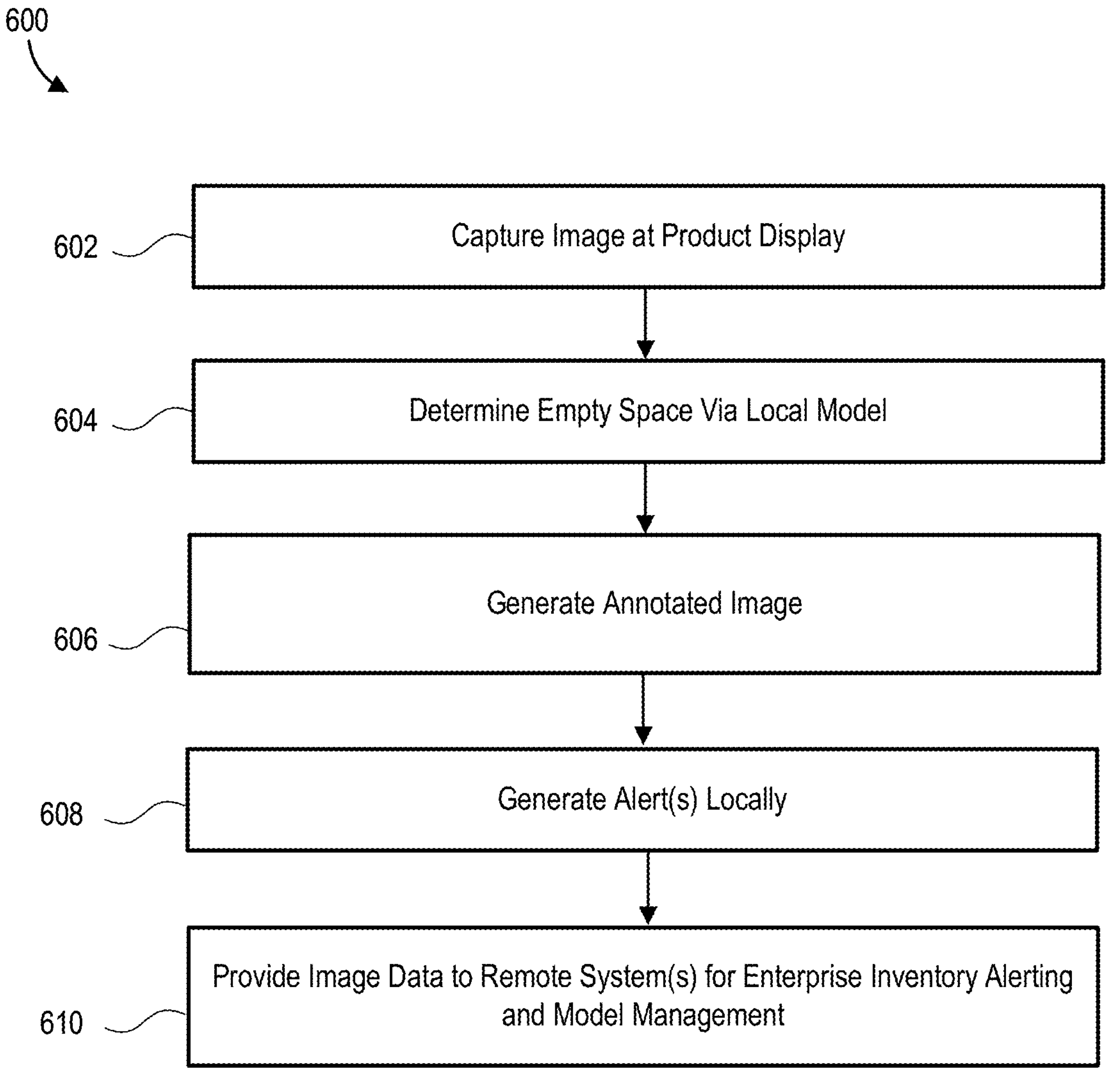
FIG. 6 is a method flowchart for drift diagnostics.

FIG. 6 shows a method 600 for use of an in-store, real time product display analysis. At 602, an image is captured of a product display. The image can be used at 604 to determine empty space, using a model. The model used at 604 is local—that is, it uses sufficiently low computational resources that it can be implemented on the same local network as the camera that captured the image at 602.

At 606, an annotated image is generated. The image captured at 602 can be marked with an annotation (as shown in FIGS. 3-5) that corresponds to an empty space identified by the local model.

At 608, an alert is generated locally. The alert can be an indication that there is empty space on a shelf that needs restocking. The alert can be delivered to store associates, such as through handheld devices, automated audio transmissions on store intercom systems, or a centralized computing system that indicates where restocking is needed. Alerts may be provided in real-time as empty space is detected. In an alternative embodiment, instead of individual alerts the method 600 could be used to create a worklist that updates, in real time, a prioritized list of locations needing restocking based upon the empty space annotations.

Other types of alerts that can be issued at 608 can include areas where the model is unable to positively determine that there is an empty space, in which case the image may be sent to a human for review and feedback at 610. This feedback can also be used to improve the model if the drift analysis (see FIG. 7) indicates that the model is no longer sufficiently accurate and needs retraining.

Figure 7:
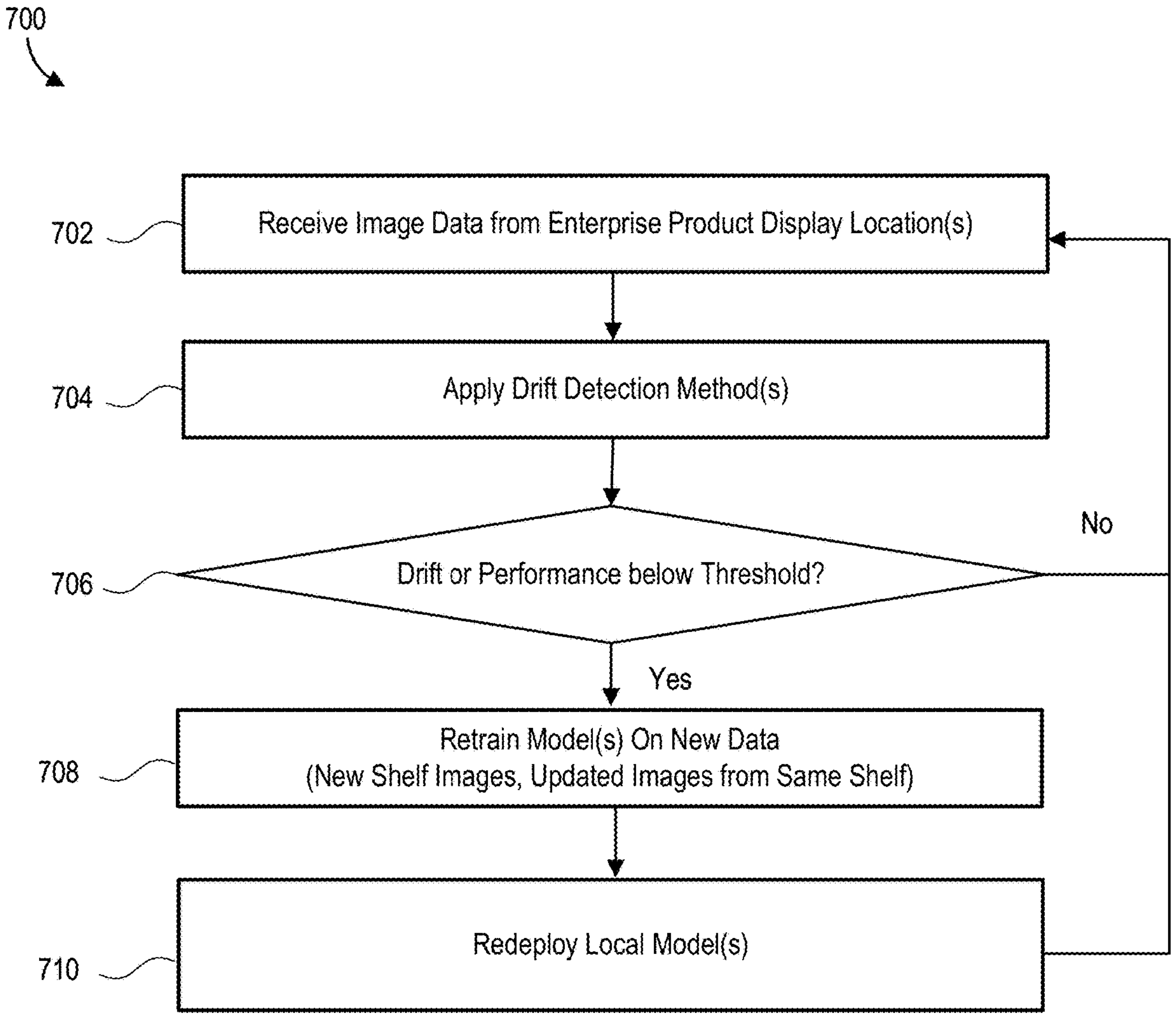
FIG. 7 is a method flowchart for updating a locally stored model reusable across multiple product displays and usable in real-time.

FIG. 7 shows a method 700 for updating a locally stored model reusable across multiple product displays and usable in real-time as described above.

At 702, an image or data corresponding to an image is received from one or more product display locations at a computing system. The image or data are received at a computing system that is located at the same location as the product displays. For example, both the product displays and the computing system can be located at the same location in that they are located in the same store in a retail enterprise. Both the product displays and the computing system can be arranged at the same location in that both the computing system and the cameras that capture images of the shelves are on the same Local Area Network, mesh network, or other network location that does not require sending of signal through a remote network to transfer from the former to the latter.

At 704, drift detection methods are applied. Drift detection is used to determine when a locally-operated model as described with respect to 702 should be updated. Drift can take a number of forms. For example, drift can occur as product displays are updated with new displays, products, or arrangements that were not represented as well in a set of training data. Additionally or alternatively, changes in lighting, camera orientation, product packaging, or other changes to either the product display itself, the products on it, or the camera, can create changes in the sensed images that may not be as well suited to analysis by a previously-suitable model.

At 706, the performance of the model is reviewed. Drift and performance can be reviewed by comparison to manually measured levels of stock. In one example, store associates provide feedback about instances in which the model identifies empty space that is not actually present, or in contrast where the model fails to identify empty space. From this feedback, the model can be compared to a threshold success level, such as missing 2% or more of actual empty space on a shelf or identifying 5% or more empty space that does not actually exist. The threshold can vary by product display type. Some aisles are given higher importance because OOS conditions are more critical, such as aisles with basic foodstuffs or feminine hygiene products. In product displays for products where OOS is more critical, not only can detection frequency be increased as discussed above, but a lower threshold for drift and performance can be set.

If the performance level of the model is not below the threshold, then the method 700 returns to the beginning at 702 and additional images are detected. On the other hand, if enough changes have occurred to the products, the display, or the detection system such that drift has increased and the threshold is exceeded, the model can be retrained at 708.

Retraining the model at 708 can incorporate new data, such as new shelf images, or updated images from the same shelf. Because retraining a model takes relatively more computational resources than operating the model, the retraining may take place at an offsite location in some examples. Retraining the model 708 can occur at a networked location that is distant from the product display, the camera(s), and the local implementation of the model.

One the model is retrained at 708, the retrained model can be redeployed at 710 where the product display(s), camera (s), and local implementation of the model are located.

In alternative embodiments, retraining the model 708 and redeploying the model 710 can be conducted using the same local computing resources that review the image data. That is, it is not always necessary to use offsite or networked resources to retrain the model. There may be sufficient on-site computing resources to perform occasional retraining, or the on-site computing resources may be utilized for such purposes during downtime, such as after normal store hours.

Figure 8:
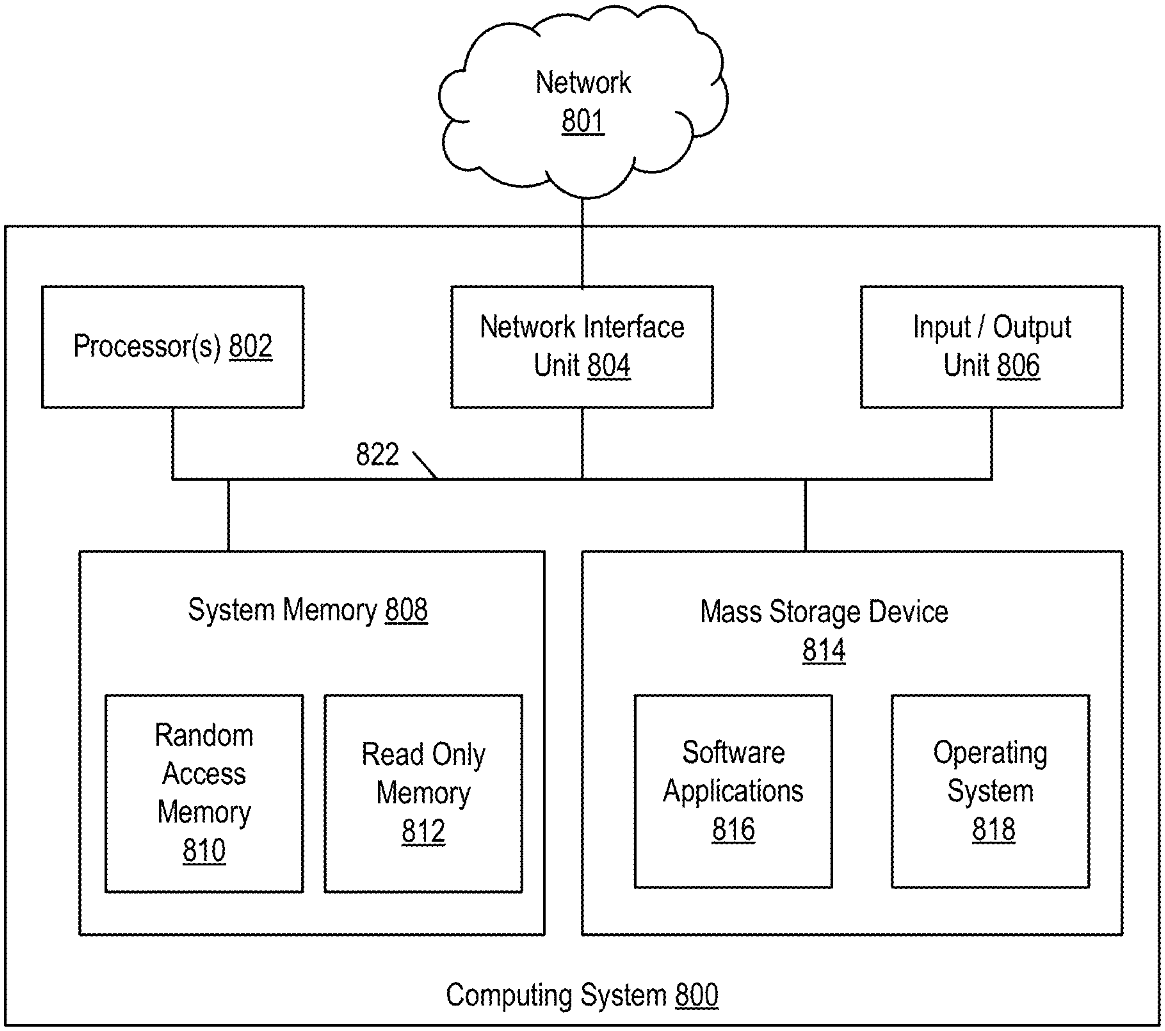
FIG. 8 illustrates an example computing system with which aspects of the present disclosure may be implemented.

FIG. 8 illustrates an example block diagram of a virtual or physical computing system 800. One or more aspects of the computing system 800 can be used to implement the processes described herein.

In the embodiment shown, the computing system 800 includes one or more processors 802, a system memory 808, and a system bus 822 that couples the system memory 808 to the one or more processors 802. The system memory 808 includes RAM (Random Access Memory) 810 and ROM (Read-Only Memory) 812. A basic input/output system that contains the basic routines that help to transfer information between elements within the computing system 800, such as during startup, is stored in the ROM 812. The computing system 800 further includes a mass storage device 814. The mass storage device 814 is able to store software instructions and data. The one or more processors 802 can be one or more central processing units or other processors.

The mass storage device 814 is connected to the one or more processors 802 through a mass storage controller (not shown) connected to the system bus 822. The mass storage device 814 and its associated computer-readable data storage media provide non-volatile, non-transitory storage for the computing system 800. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 800.

According to various embodiments of the invention, the computing system 800 may operate in a networked environment using logical connections to remote network devices through the network 801. The network 801 is a computer network, such as an enterprise intranet and/or the Internet. The network 801 can include a LAN, a Wide Area Network (WAN), the Internet, wireless transmission mediums, wired transmission mediums, other networks, and combinations thereof. The computing system 800 may connect to the network 801 through a network interface unit 804 connected to the system bus 822. It should be appreciated that the network interface unit 804 may also be utilized to connect to other types of networks and remote computing systems. The computing system 800 also includes an input/output controller 806 for receiving and processing input from a number of other devices, including a touch user interface display screen, or another type of input device. Similarly, the input/output controller 806 may provide output to a touch user interface display screen or other type of output device.

As mentioned briefly above, the mass storage device 814 and the RAM 810 of the computing system 800 can store software instructions and data. The software instructions include an operating system 818 suitable for controlling the operation of the computing system 800. The mass storage device 814 and/or the RAM 810 also store software instructions, that when executed by the one or more processors 802, cause one or more of the systems, devices, or components described herein to provide functionality described herein. For example, the mass storage device 814 and/or the RAM 810 can store software instructions that, when executed by the one or more processors 802, cause the computing system 800 to receive and execute managing network access control and build system processes.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of queueing structures, technologies disclosed herein are applicable to data structures generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A system for real-time, on-site empty shelf detection, the system comprising:
- a network of retail stores having disparate capacities in on-site computational resources;
- a plurality of cameras configured to capture corresponding images at a plurality of product displays at a respective retail store within the network of retail stores;
- an in-store computing system configured to receive the images from the plurality of cameras, the in-store computing system comprising:
  - a memory storing a machine learning model for empty space detection; and
  - a processor configured to implement the machine learning model to analyze the images and annotate the images with indications of empty space therein and perform one or more quantization or pruning operations on the machine learning model,
- wherein the quantization or pruning operations use one or more inference run-time metric to ensure that the model is scaled for deployment depending upon available on-site computational resources of the respective retail store within the network of retail stores,
- wherein the machine learning model is not replaced after the quantization or pruning operations, and
- wherein the machine learning model is configured to determine a quantity of empty space at the plurality of different product displays corresponding to the images from the plurality of cameras.

2. The system of claim 1, wherein the processor is configured to conduct a drift analysis by either adjusting a frequency of imaging by the at least one camera or by causing the machine learning model to be updated upon detecting a predetermined threshold of drift.

3. The system of claim 1, wherein annotating the image with the indication of an empty space comprises annotating the image with a flat face representing a front of an empty shelf section.

4. The system of claim 3, wherein the quantity of empty space at the product display is a volume of a cuboid region on the product display behind the flat face.

5. The system of claim 3, wherein annotating the image with the indication of an empty space further comprises annotating the image with a flat face representing a back end of the empty shelf section.

6. The system of claim 1, further comprising an image modeling system remote from the retail environment, the image modeling system communicatively coupled to the inference server and comprising a model development pipeline that includes:
- creating a filtered data set of image samples of a retail shelf, the image samples meeting predefined quality criteria;
- receiving annotations of the filtered data set of image samples identifying one or more empty locations;
- forming a trained model usable to identify empty shelf regions, the trained model being based on the filtered data set of image samples and associated annotations;
- wherein a model deployment platform is configured to:
- receive, in a realtime data stream, one or more shelf camera images from cameras installed at the retail location; and
- generate an output data stream indicative of shelf and product availability information based on the trained model generated via the model development pipeline.

7. The system of claim 1, wherein determining a type of aisle corresponding to the at least one image comprises determining a type of product located at the aisle.

8. The system of claim 7, wherein the type of product located at the type of aisle is a product that is stacked on a shelf.

9. The system of claim 7, wherein the type of product located at the type of aisle is a product that is arranged on a hanger.

10. A method for empty shelf detection, the method comprising:
- detecting, by a plurality of cameras each arranged at a respective retail store within the network of retail stores, the network of retail stores having disparate capacities in on-site computational resources, an image corresponding to a corresponding plurality of product displays;
- sending the images corresponding to the plurality of product displays to an in-store computing system in realtime;
- implementing a machine learning model to analyze the image and annotate the images with indications of an empty space;
- performing one or more quantization or pruning operations on the machine learning model,
- wherein the quantization or pruning operations use one or more inference run-time metric to ensure that the model is scaled for deployment depending upon available on-site computational resources of the respective retail store within the network of retail stores, and
- wherein the machine learning model is not replaced after the quantization or pruning operations;
- determining a quantity of empty space at the plurality of product displays corresponding to the images; and
- adding a product to the product display at a location corresponding to the empty space.

11. The method of claim 10, further comprising conducting a drift analysis by either adjusting a frequency of imaging by the at least one camera or by causing the machine learning model to be updated upon detecting a predetermined threshold of drift.

12. The method of claim 10, wherein annotating the image with the indication of an empty space comprises annotating the image with a flat face representing a front of an empty shelf section.

13. The method of claim 12, wherein the quantity of empty space at the product display is a volume of a cuboid region on the product display behind the flat face.

14. The method of claim 12, wherein annotating the image with the indication of an empty space further comprises annotating the image with a flat face representing a back end of the empty shelf section.

15. The method of claim 14, wherein the quantity of empty space at the product display is a volume of a cuboid region between the flat face representing the front of the empty shelf section and the flat face representing the back end of the empty shelf section.

16. The method of claim 10, wherein determining a type of aisle corresponding to the at least one image comprises determining a type of product located at the aisle.

17. The method of claim 16, wherein the type of product located at the type of aisle is a product that is stacked on a shelf.

18. The method of claim 10 further comprising:

obtaining the machine learning model from an image modeling system remote from the retail environment, the image modeling system communicatively coupled to the inference server and comprising a model development pipeline that is executable on the one or more in store computing system, wherein the model development pipeline includes:

creating a filtered data set of image samples of a retail shelf, the image samples meeting predefined quality criteria;

receiving annotations of the filtered data set of image samples identifying one or more empty locations;

forming a trained model usable to identify empty shelf regions, the trained model being based on the filtered data set of image samples and associated annotations;

wherein a model deployment platform is configured to:

receive, in a realtime data stream, one or more shelf camera images from cameras installed at the retail location; and generate an output data stream indicative of shelf and product availability information based on the trained model generated via the model development pipeline.

19. A real time empty shelf detection system comprising:

one or more in-store computing systems at a respective retail store within a network of retail stores having disparate capacities in on-site computational resources, the one or more in-store computing systems implementing a model development pipeline and a model deployment platform;

wherein the model development pipeline includes:

creating a filtered data set of image samples of a retail shelf, the image samples meeting predefined quality criteria;

receiving annotations of the filtered data set of image samples identifying one or more empty locations;

forming a trained model usable to identify empty shelf regions, the trained model being based on the filtered data set of image samples and associated annotations; and performing one or more quantization or pruning operations on the trained model, wherein the quantization or pruning operations use one or more inference run-time metric to ensure that the model is scaled for deployment depending upon available on-site computational resources of the respective retail store within the network of retail stores, wherein the machine learning model is not replaced after the quantization or pruning operations; and wherein the model deployment platform is configured to:

receive, in a realtime data stream, one or more shelf camera images from cameras installed at the retail store; and generate an output data stream indicative of shelf and product availability information based on the trained model generated via the model development pipeline.

20. The real time empty shelf detection system of claim 19, wherein generating an output data stream indicative of shelf and product availability information based on the trained model generated via the model development pipeline comprises annotating the one or more shelf camera images from the cameras installed at the retail store with a flat face corresponding to the empty shelf regions therein.

* * * * *